Oct. 20, 1953  J. H. BLOMSTRAND  2,656,204
WIRE NUT
Filed Nov. 10, 1950
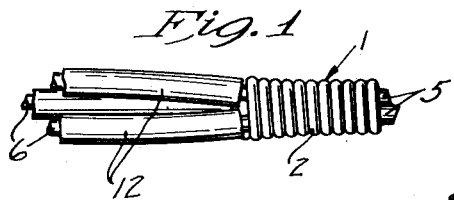
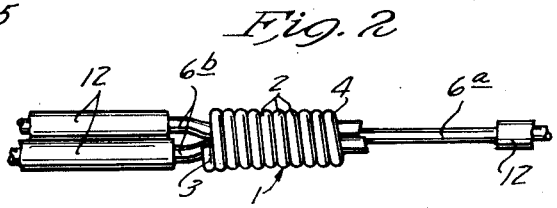
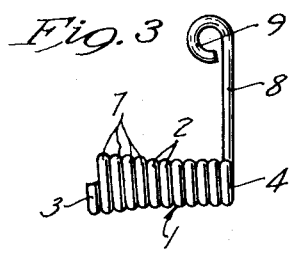
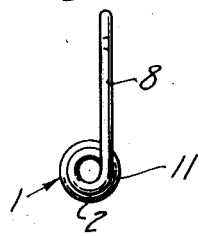
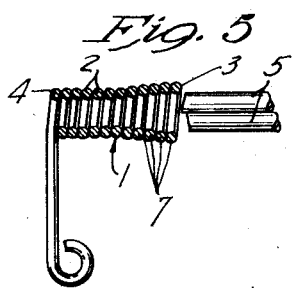
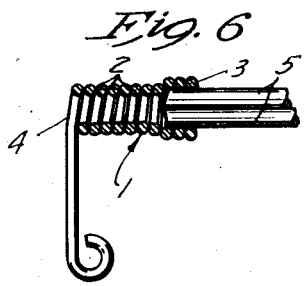
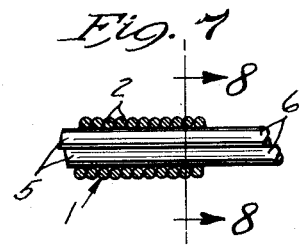
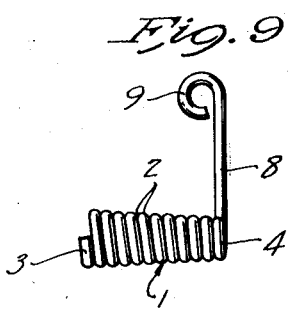
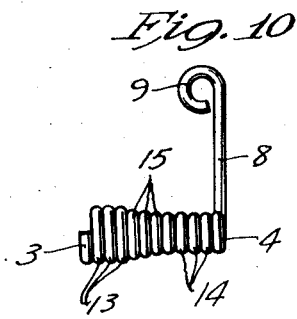
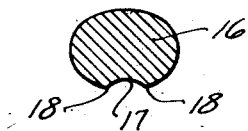
Inventor
John H. Blomstrand
By Merchant & Merchant
Attorney Patented Oct. 20, 1953

2,656,204

UNITED STATES PATENT OFFICE 2,656,204

WIRE NUT

John H. Blomstrand, Minneapolis, Minn., assignor of one-half to Frederick W. Nyquist, Minneapolis, Minn.

Application November 10, 1950, Serial No. 195,090

2 Claims. (Cl. 287—78)

1

My invention relates to devices for securing the ends of wire together without soldering, welding, or the like, and is hereinafter referred to as a wire nut.

The primary object of my invention is the provision of an extremely inexpensive device which may be used to quickly and firmly secure the free ends of at least two strands of wire together.

A still further object of my invention is the provision of a wire nut in the nature of an elongated coil of resilient wire which is provided at one end with a detachable handle and which coil may be readily screwed onto the overlapped ends of at least two lengths of wire and a novel handle member thereafter readily detached or severed.

A still further object of my invention is the provision of an inexpensive wire nut which may be easily secured to the overlapped ends of at least two lengths of wire which will grip the overlapped ends together with great force.

A still further object of my invention is the provision of a wire nut which is not materially larger in diameter than a circle circumscribing the abutting ends of the wire strands sought to be secured together.

The above and still further objects of my invention will become apparent from the following detailed specification, appended claims, and attached drawings.

Referring to the drawings, wherein like characters indicate like parts throughout their several views:

Fig. 1 is a view in elevation of my novel structure secured to the overlapping ends of a plurality of strands of wire;

Fig. 2 is a view corresponding to Fig. 1 but showing a slightly different use of my novel structure;

Fig. 3 is a view in elevation of my novel device with the integrally - formed handle secured thereto;

Fig. 4 is a view in end elevation of the structure of Fig. 3;

Fig. 5 is a view, partly in axial section and partly in elevation, illustrating the first step in the use of my novel device;

Fig. 6 is a view corresponding to Fig. 5 but illustrating a further step in the use of my novel structure;

Fig. 7 is a view corresponding to Fig. 6 but showing a still further step in the use of my novel structure;

Fig. 8 is a view in section taken substantially on the line 8—8 of Fig. 7;

Fig. 9 is a view corresponding to Fig. 3 but illustrating a slightly modified form of my structure;

Fig. 10 is a view corresponding to Fig. 9 but illustrating a still further modified form of my invention; and Fig. 11 is a view in cross section of a novel form

2 of wire which may be utilized in my novel invention.

Referring with greater particularity to the drawings and, more specifically, to the structure of Figs. 1–8 inclusive, the numeral 1 indicates, in its entirety, an elongated coil of resilient wire, the convolutions 2 of which are wound in side by side abutting relationship. It will be noted that the axial opening through the coil of wire 1 is of greater diameter at end 3 than at end 4. In practice, the convolution 2 adjacent the enlarged end 3 defines a receiving mouth for the overlapped loose ends 5 of the wire strands 6 to be secured together. An important feature of my invention is that the axial passage through the coil 1 is gradually expanded—this being accomplished by a plurality of convolutions, all identified by the numeral 7 in Fig. 3, being increasingly greater in diameter from the first thereof to the one adjacent the enlarged end 3.

Another novel feature of my invention resides in the providing of a novel applicator handle 8 which is integrally-formed with the convolution 2 at the smaller end 4 of the coil 1 and constitutes a tangential projection therefrom. To insure proper leverage, the handle 8, as shown, has a longitudinal dimension greater than twice the diameter of the nut-forming coil 1. Preferably and as shown, the handle 8 at its outer end is bent to provide an enlarged circular head 9. Furthermore, preferably and as shown, the radially outer surface of the convolution 2 defining the small end 4 of the coil 1 at the point of intersection with the handle 8 is weakened or notched as at 11 for a purpose which will hereinafter become apparent.

When it is desired to secure together the ends 5 of two or more strands of wire 6, which are overlapped in the manner of Figs. 5, 6, and 7, all insulating or other covering material 12, if in truth there be any, is first removed for a distance approximately equal to the length of the coil wire nut 2. A wire nut 2 is then selected which has a receiving mouth 3 capable of receiving therein the overlapped wire ends 5. Simultaneous inward and rotary movement to said coil, in a clockwise direction, is then imparted thereto through the medium of the handle 8. It will be noted that the small end 4 of the coil 2 is of less diameter than the combined diameters of the overlapped ends 5 if there be but two such ends. If there be three such ends, as shown in Fig. 8, the diameter of the small end 3 of the coil 1 is less than the diameter of a circle circumscribing said loose ends 5. Continued rotation of the coil 1 through the medium of the handle 8, causes said coil 1 to screw itself onto the overlapped ends 5, as shown in Figs. 5–7, actual threads being formed on the radially outer surfaces of the overlapped ends 5 by virtue of the fact that the convolutions 2 adjacent the smaller end 4 of the coil 1 are of less diameter than a circle circumscribing said overlapped ends 5. It will be noted that rotation of the handle 8 in a clockwise direction tends to unwind the coil 1. In fact, it is this unwinding force, exerted by the handle 8, which enlarges the convolutions 2 adjacent the small end 4 of the coil 1 to enable same to encompass the overlapped ends 5 of the wire 6. Obviously, therefore, when this unwinding force is terminated, the convolutions 2 adjacent the reduced end 4 of the coil 1 tend to return to their normal diameters, thus exerting a terrific gripping force against the overlapped ends 5. In fact, this force is so great that I have found that connections formed in this manner are frequently stronger than the wire strands so connected.

In Fig. 2, I have illustrated that my novel structure may be utilized to secure together the overlapped ends 5 of wires 6, which extend in opposite directions. This is accomplished initially by placing the single wire, therein identified by the numeral 6a, through the smaller end 4 of the coil 1 and thereafter causing the same to come into overlapping relationship with the ends of one or more wires 6b just inside of the receiving mouth 3. Thereafter, rotation of the coil 1 in a clockwise direction while axial pressure is exerted thereon in the direction of the wires 6b will cause the nut 1 to assume the position shown in Fig. 2.

When my wire nut 1 is properly positioned, the handle element 8 no longer serves any useful function and it may be removed or severed from the coil 1 by imparting thereto a circular motion in a counterclockwise direction, that is, in a direction in which the coil 1 is wound. Such movement causes the handle 8 to break off precisely at the notch 11. Thereafter, and particularly in the event that the wires being secured together by my novel nut 1 are electrical conduits, the exposed portions of the wires 6, as well as the nut 1, may be covered by suitable insulating tape.

In Fig. 9, I have illustrated a slightly modified structure wherein the convolutions 2 increase progressively in diameter from the small end 4 to the large end 3. In all other respects, this structure is identical with the structure of Figs. 1-8 inclusive.

In Fig. 10, I have shown a still further modified form of my invention in which a plurality of convolutions 13, adjacent the large end 3, are of uniform diameter and thus define an elongated receiving mouth, whereas a plurality of convolutions 14, adjacent the small end 4 are of uniform diameter. The convolutions 15, intermediate the convolutions 13 and 14, are progressively larger in diameter toward the large end 3. In all other respects, this structure is likewise similar to the structure of Figs. 1-8 inclusive.

In Fig. 11, I have shown a type of wire which may be utilized in the formation of the novel coils comprising my novel wire nut. As there shown, the radially inner surface of the wire 16 is longitudinally notched as at 17 to provide relatively sharp thread-forming ridges 18.

I have found that my novel structure may be used to secure together not only single strand wires but also multiple strand or cable-type wires.

My invention has been thoroughly tested and found to be completely satisfactory for the accomplishment of the above objects; and, while I have illustrated a preferred and several modified forms thereof, it should be obvious that my invention may be still further modified without departure from the spirit and scope of the invention as defined by the appended claims.

What I claim is:

1. A device for connecting the ends of a plurality of wires, comprising an elongated coil of resilient wire of a quality capable of forming threads upon said plurality of wires when in pressing contact therewith and being accessible for the reception of wire ends from both ends thereof, the axial opening through the coil being of greater diameter at one end than at the other and the coil including convolutions of successively reduced diameter intermediate the ends of greater and smaller diameter, said convolutions being coiled in a direction such that said end of greater diameter will move forwardly when the coil is turned in threaded engagement with said plurality of wires, and an extremity formed integrally at the end of the last convolution of said smaller end and extending outwardly from the circle defined by said last convolution, said extremity providing a tangential handle for threadedly advancing said end of greater diameter in engagement with said plurality of wires and for simultaneously increasing slightly the diameter of said convolutions at the smaller diameter end whereby upon release of said handle the coil will contract in augmented gripping relation with the threads formed on said plurality of wires.

2. A device for connecting the ends of a plurality of wires, comprising an elongated coil of resilient wire of a quality capable of threadably advancing upon said plurality of wires when in encircling and pressing contact therewith and being accessible for the endwise reception of a plurality of wire ends, the axial opening through the coil being of greater diameter at one end than at the other end and the coil including convolutions each of which is successively reduced in diameter from that of the preceding convolution for at least a substantial portion of the length of the coil, said convolutions being coiled in a direction such that said end of greater diameter will move forwardly when the coil is turned relative to said plurality of wires, and an extremity formed at the end of the last convolution of said smaller end and extending outwardly from a tangential connection with the circle defined by said last convolution, said extremity providing a handle for threadably advancing said end of greater diameter in engagement with said plurality of wires and for simultaneously increasing slightly the diameter of said engaging convolutions whereby upon release of said handle the coil will contract, each of a plurality of individual convolutions independently exerting augmented gripping force on said plurality of wires.

JOHN H. BLOMSTRAND.

References Cited in the file of this patent

UNITED STATES PATENTS

| Number | Name | Date |
| --- | --- | --- |
| 809,880 | Woolldridge | Jan. 9, 1906 |
| 953,638 | McFaa | Mar. 29, 1910 |
| 1,448,367 | Thomas | Mar. 13, 1923 |
| 1,460,624 | Gelderen | July 23, 1923 |
| 1,933,555 | Jasper | Nov. 7, 1933 |
| 2,066,886 | Henn | Jan. 5, 1937 |
| 2,110,458 | Applegate | Mar. 8, 1938 |
| 2,199,532 | Weeks | May 7, 1940 |
| 2,390,514 | Cram | Dec. 11, 1945 |

FOREIGN PATENTS

| Number | Country | Date |
| --- | --- | --- |
| 145,665 | Austria | of 1935 |
| 194,018 | Great Britain | of 1923 |